(12) United States Patent
Dubois

(10) Patent No.: US 7,047,719 B2
(45) Date of Patent: May 23, 2006

(54) BALER AND PROCESS

(75) Inventor: Jean-Yves Dubois, Cresancey (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/937,634

(22) Filed: Sep. 9, 2004

(65) Prior Publication Data

US 2005/0072133 A1    Apr. 7, 2005

(30) Foreign Application Priority Data

Sep. 19, 2003  (DE)  ................ 103 43 386

(51) Int. Cl.
*A01D 76/00*  (2006.01)
*A01D 78/00*  (2006.01)
*A01D 80/00*  (2006.01)
*A01D 84/00*  (2006.01)

(52) U.S. Cl. .......................... 56/341; 100/50

(58) Field of Classification Search ............... 56/341, 56/DIG. 1; 100/188, 50, 189, 142

See application file for complete search history.

(56) References Cited

U.S. PATENT DOCUMENTS

| | | | | |
|---|---|---|---|---|
| 4,135,444 A | * | 1/1979 | White et al. ................ | 100/50 |
| 5,467,702 A | * | 11/1995 | Naaktgeboren et al. ....... | 100/35 |
| 5,950,410 A | * | 9/1999 | O'Brien et al. ............... | 56/341 |
| 6,647,706 B1 | | 11/2003 | Vogt et al. | |
| 2002/0174781 A1 | * | 11/2002 | Leupe et al. ................. | 100/88 |

FOREIGN PATENT DOCUMENTS

| | | |
|---|---|---|
| DE | 12 14 138 | 4/1966 |
| DE | 272 983 | 6/1988 |
| EP | 1 306 002 | 10/2002 |
| GB | 1 600 443 | 10/1981 |
| GB | 2 219 967 | 6/1989 |
| NL | 7 807 102 | 1/1980 |

* cited by examiner

*Primary Examiner*—Árpád Fábián Kovács

(57) ABSTRACT

A large rectangular baler is equipped with a stuffer fork used both for blocking crop, that is being pre-compressed in a supply channel, from passing through an inlet of a baling chamber, and for sweeping the pre-compressed crop into the baling chamber once a pre-selected condition has been met.

2 Claims, 2 Drawing Sheets

BALER AND PROCESS

FIELD OF THE INVENTION

The invention concerns a baler with a rectangular or slab-shaped baling chamber and a movable baling piston engaged in it and a process for the operation of such a baler.

BACKGROUND OF THE INVENTION

U.S. Pat. No. 6,647,706 shows a baler with a rectangular baling chamber, in which a movable baling piston is arranged. The crop to be baled is supplied to the baling chamber through an inlet for the crop to be baled which is closed by a hold-back fork during a pre-compression of the harvested crop in a supply channel.

GB 2,219,967 B shows an alternative concept of a baler, where here several compression forks are provided that operate continuously, which are simultaneously used as loader forks and that are mechanically connected with the baling plunger in such a way that the baling plunger itself closes the inlet for the crop to be baled in the supply channel during the pre-compression of the harvested crop.

The problem underlying the invention is seen in the costly configuration of such balers.

SUMMARY OF THE INVENTION

According to the present invention, there is provided a novel structure for holding crop in the pre-compression chamber prior to it being inserted into the baling chamber.

An object of the invention is to provide a large rectangular baler having a baling chamber provided with a crop inlet to which a compression chamber is attached and to provide a stuffer fork which performs the function of blocking the crop inlet so that crop is retained in the pre-compression chamber while crop is being stuffed into it, and then for uncovering the inlet and sweeping the accumulated crop through the inlet.

Thus, the stuffer fork of the baler performs two tasks, whereby the configuration of the baler is simplified because the use of a hold-back fork can be omitted. In addition, it is no longer necessary for the baling plunger to be located in an extended position wherein it closes the inlet during the pre-compression of the crop. This permits a movement of the baling plunger independently of the compression fork so that it may perform a compression stroke only when a sufficient load of pre-compressed crop has been inserted into the baling chamber by the stuffer fork.

If the position of the stuffer fork is determined at least as a function of the compressed density of the crop to be baled in the supply channel, this provides the assurance that the crop to be baled always has the same density in the supply channel, whereby uniform bales are produced. But the use of a time control or a measurement of the throughput etc. is conceivable in order to determine the position of the stuffer fork after a predetermined time has elapsed, after the supply of a certain amount of crop or in a similar manner.

If the stuffer fork frees the crop inlet upon the crop to be baled reaching a certain density in the supply channel or after reaching another parameter, then crop to be baled that has accumulated in the supply channel can be brought into the baling chamber or preferably brought by the stuffer fork into the baling chamber or inserted into it.

Devices for determining the density in the supply channel of the crop to be baled can be provided in the supply channel. These devices may be configured, for example, in the form of a spring-loaded flap provided on a wall of the supply channel or they may be a component of it, that is pivoted against the force of a spring as a function of the density of the crop to be baled or generally of the action of an energy accumulator, and that interacts with a sensor, for example, in the form of a contact switch. The use of other forms of sensors is also conceivable that may, for example, directly interact with the crop to be baled.

Provision can be made for the packer fork to be pivoted, in particular transverse to the direction of the flow of the crop in the supply channel. However, a particularly compact configuration results when the stuffer fork is retracted in order to free the crop inlet or is withdrawn from the supply channel.

In order for the stuffer fork to operate to convey the crop to be baled from the supply channel into the baling chamber or to insert it into the latter, the stuffer fork is withdrawn from the supply channel and thereafter inserted into the supply channel at a second position upstream from the inlet, and then immediately swept through the channel in the direction of the crop inlet, that is back into its initial position or its first position.

Provision can also be made for the stuffer fork to occupy at least a further position in the supply channel, or to be held in that position, which is arranged between the first position and the second position. In this way, a more uniform compression of the crop in the supply channel can be achieved, in that first a compression of the crop is performed over a smaller volume as compared to that resulting when the stuffer fork in its first position. Further, the stuffer fork can be indexed to various positions leading to the first position, these positions being responsive, for example, to the supply of a predetermined amount of crop after the expiration of a predetermined time interval or the attainment of a predetermined density of the crop to be baled etc.

Baling plungers, stuffer forks, and packer forks may be connected mechanically at least partially in a conventional manner. In order to permit independent sequences of movement of the components of the baler or independent sequences of movement that are a function of input magnitudes such as, for example, the density in the supply channel of the crop to be baled, the baler may be provided with a control or regulating arrangement that determines the movement or the position of the baling plunger, the loader fork and/or of the packer fork. such a control or regulating arrangement may be provided in the baler. But a connection with a control or regulating arrangement on a towing vehicle, such as a tractor, is also conceivable. This may, for example, be a microprocessor or the control or regulating arrangement may be provided with such a device.

Such a control or regulating arrangement may interact with one or more motors provided on the baler, that determine the movement of the stuffer fork, the packer fork and/or the baling plunger or even the operation of other components of the baler. These motors may, for example, be electric motors, for instance, in the form of stepper motors. A particularly robust configuration, however, is provided by the use of hydraulic motors which preferably are supplied with hydraulic pressure from a central source.

If the stuffer fork assembly is provided with at least one such motor, it can be connected with the stuffer fork in order to move the latter. The movement of the stuffer fork is preferably a movement in the longitudinal direction by means of which the loader fork can be moved into at least one extended and one retracted position.

Beyond that, the stuffer fork assembly can be provided with a second motor that may be configured, in particular, as a hydraulic motor which moves the loader fork along a path, that follows the supply channel, particularly a curved path. For this purpose, the second hydraulic motor may act upon the first motor, which is connected, for example, free to pivot with the baler or with a frame of the baler.

Such a baler can be operated in such a way that the stuffer fork is retracted from its initial position, in which it closes the crop inlet, in order to be brought again into the supply channel in a downstream position so as to be moved again into the supply channel and moved along the supply channel towards the crop inlet and up to this inlet. The retraction of the stuffer fork can be controlled, for example, by time. But preferably, the stuffer fork is controlled in the supply channel as a function of the crop density in such a way that it frees the crop inlet upon the crop reaching a predetermined density to be baled or a predetermined pressure in the supply channel and again enters the supply channel downstream, in order to move in the direction of the crop inlet so as to bring the crop to be baled located in the supply channel into the baling chamber or to stuff it into the baling chamber.

If the stuffer fork is brought into the supply channel after the retraction from the supply channel in at least one further position between the initial position and the downstream position or brought along the supply channel out of the second position or a downstream position into this further position or retained in such a position, then a particularly uniform density of the crop to be baled can be attained. The crop to be baled is brought into the supply channel by means of a packer fork and is compressed against the stuffer fork located in the further position. The stuffer fork remains in this position until a predetermined density of the crop to be baled has been attained in the supply channel or even a certain time has elapsed or a predetermined amount of crop has been supplied etc., in order to be retracted again so as to enter the supply channel in the downstream position, so as to convey the crop to be baled into the baling chamber or to stuff it into the baling chamber. This is an independent invention that can be applied to a baler even without the characteristics described above, for example, to a conventional baler provided with a hold-back fork or the like. Beyond that, provision can be made for the stuffer fork to be moved in the direction of the crop inlet, if it has been brought into a further position in the supply channel, to further compress the crop to be baled, that was pre-compressed by the packer fork.

BRIEF DESCRIPTION OF THE DRAWINGS

The drawing shows an embodiment of the invention that shall be described in greater detail in the following.

DESCRIPTION OF THE PREFERRED EMBODIMENT

Figure 1:
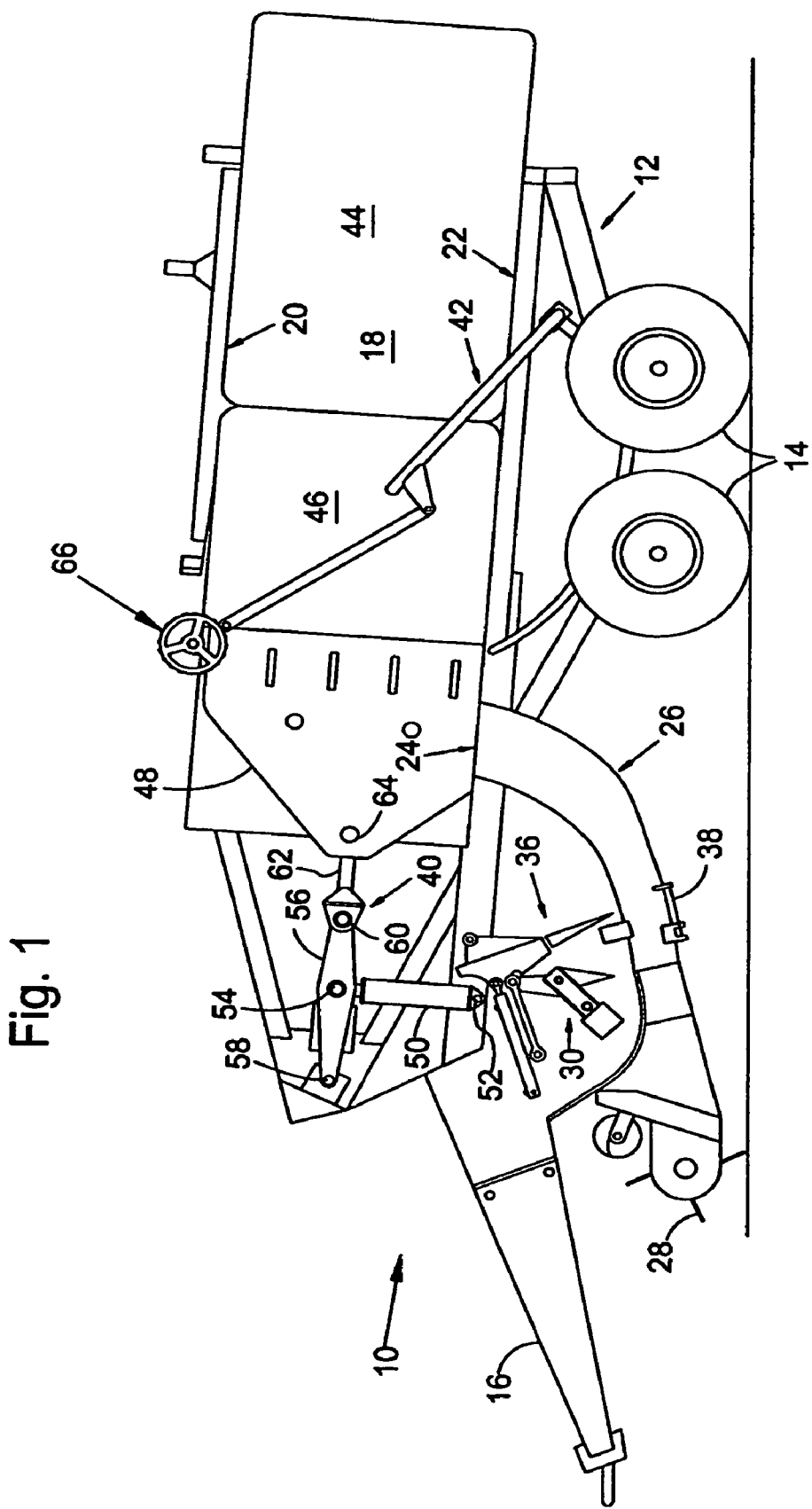
FIG. 1 is a schematic left side view of a baler constructed in accordance with the invention.

FIG. 1 shows a baler 10 in the form of a large baler for the production of parallelepiped bales that is provided with a frame 12 which is supported on the ground by tandem wheels 14. A towbar 16 is connected to the frame 12 and extends from it to the front and is configured in such a way that it can be connected to a towing vehicle, such as an agricultural tractor, not shown, which is equipped with a power take-off shaft in order to provide power to various driven components of the baler 10. A baling chamber 18 of rectangular cross section is formed in part by an upper chamber wall 20 and a lower chamber wall 22, where the lower chamber wall 22 is provided with a crop inlet 24, which is connected to a curved supply channel 26 that is used as a pre-compression chamber, as will be described in the following. A take-up arrangement 28 in the form of a pick-up with a screw conveyor conveying to the center is arranged ahead of the supply channel 26 in order to raise a swath of harvested crop from the ground and to deliver it to a packer fork 30 which is used to compress harvested crop into the supply channel 26, until a load of pre-selected density has accumulated in the supply channel 26 and is inserted by means of a stuffer fork assembly 36 through the crop inlet 24 into the baling chamber 18. A spring-loaded flap or a device 38 is mounted, free to pivot, at a forward lower location of the supply channel 26, and indicates when a desired density of the harvested crop in the supply channel 26 has been reached, in order to supply current to an electrical control circuit (not shown), that establishes corresponding drive connections which activate the loader fork assembly 36 in such a way that it can move the charge or slice of harvested crop into the baling chamber 18. The following will describe in greater detail the operation of the stuffer fork assembly 36.

When the load of harvested crop was brought into the baling chamber 18, a plunger mechanism 40, which is arranged ahead of the frame 12 is actuated in a controlled sequence after the stuffer fork assembly 36, in order to move the crop to be baled to the rear of the baling chamber 18, where it is compressed in a stack as is well known in the state of the art. After the stack of compressed material has reached a predetermined length, a needle assembly 42 for the delivery of wrapping twine is actuated. The needle assembly 42 includes several curved needles, in order to conduct several strands of twine to a corresponding number of knot tying devices, not shown, which operate in such a way-that they wrap lengths of twine around the predetermined length of the stack of crop to be baled, in order to form a bale 44 that is ready for discharge. Discharge of the bale 44 takes place when the bale is pushed out of the rear end region of the baling chamber 18 by a partial bale 46, as it increases in length since new charges or slices of harvested crop are being inserted into the baling chamber 18 and compressed by the plunger mechanism 40.

From the details of the plunger mechanism 40, it can be seen that the latter includes a baling plunger 48 that is arranged for a back-and-forth movement in the baling chamber between a retracted position ahead of the crop inlet 24 and an extended position beyond the crop inlet 24 (see FIG. 1). This movement of the plunger 48 has the result that charges of harvested crop, that are introduced into the baling chamber from the supply channel 26, are compressed against a stack of harvested crop, that includes a partially formed part of a bale 46 and/or the complete bale 44. Moreover, the plunger mechanism 40 includes a drive 50 configured as a retractable and extensible actuating arrangement, that is shown here as a double-acting hydraulic cylinder-piston unit whose cylinder end is anchored at a location above the compression fork 30 by means of a pin 52, free to pivot, on the frame 12. The piston end of the drive 50 is connected at a connecting point 54, perhaps with a pin, at one point between opposite ends of a first steering arm 56 used as a crank arm, whose forward end region is connected to a bearing location 58, free to pivot, on the frame 12. A rear end region of the first steering arm 56 is connected at a bearing location 60, perhaps with a pin, to a forward end region of a second steering arm 62 operating as a connecting rod, whose rear end region is connected to the baling plunger 48 in a bearing location 64, perhaps by means of a pin. Here it should be noted that the connecting pins of the bearing locations 58 and 64 are arranged along a line of centers that lies along or approximately along a central longitudinal axis of the baling chamber 18. This has the result that the reaction force of the harvested crop acting upon the baling plunger 48 is absorbed generally by the drive 50, when the first and the second steering arms 56 and 62 are located along a line, which is the case when the baling piston 48 is located in its rear end position. Furthermore, it should be noted that each of the two steering arms 56 and 62 could be configured as a pair of steering arms that are provided with a spacing from each other in the transverse direction. Then, the drive 50 would be connected at the connecting point 54 (a pin) at a connecting point between the pair of steering arms 56, which form the first steering arm 56. Therefore, it can be seen that the baling plunger 48 forms the slider of a slider crank mechanism which contains a first steering arm 56 as a crank arm and a second steering arm 62 as a connecting rod. Although the linkage formed by the steering arms 56 and 62 doesn't move across a dead center position, it could be characterized as a toggle mechanism or toggle joint. Although the preferred embodiment shows a drive 50, that is connected to the first steering arm 56 at a point between the opposite ends of the first steering arm 56, the drive could furthermore be connected at any other point between the bearing location 58 and the bearing location 64, for example, the drive 50 could be connected to the pin at bearing location 60 or to a point along the length of the second steering arm 62, where the operation could be performed in a better form than known arrangements, in which the actuating arrangement is connected directly to the baling plunger 48.

Further details of this baler 10 are described in U.S. Pat. No. 5,950,410, issued 14 Sep. 1999, whose disclosure is incorporated herein. It should be noted that a conventional crank drive could be used in place of the special hydraulic motor drive described there.

Figure 2:
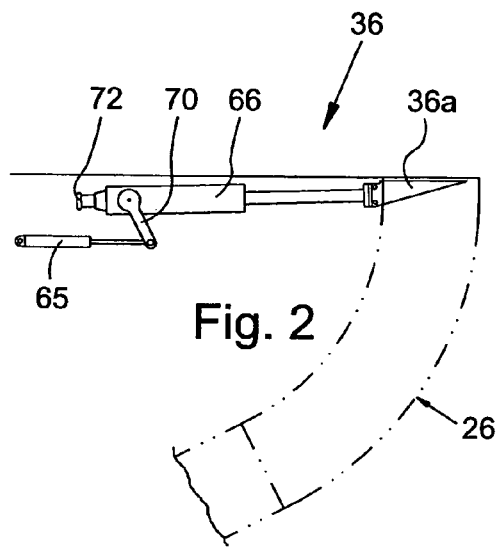
FIGS. 2–5 show enlarged views of the supply channel of the baler with a stuffer fork in various different positions.

Referring now to FIG. 2, there is shown an enlarged view of the supply channel 26 illustrating the stuffer fork assembly 36 in a first position, wherein it is inserted into the channel 26 in blocking relationship to the inlet 24 to the baling chamber 18. The stuffer fork assembly 36 is provided with a loader fork 36a, a first hydraulic motor or a first motor 66, that can move the stuffer fork 36a in the longitudinal direction, and a second hydraulic motor or a motor 65 that is connected to the first motor 66 over a lever 70 in such a way that the motor 66 pivots about a pivot point 72 upon a retraction or extension of the motor 65.

When in its initial or first position illustrated in FIG. 2, the second motor 65 is in an extended condition, whereby the first motor 66 is retained in a position by the lever 70 in which it is oriented approximately parallel to the lower wall 22 of the baling chamber 18. The loader fork 36a is extended and is located as an extension of the first motor 66 in an upper position, that is at least approximately parallel to the lower wall 22 and is thereby arranged so as to extend through slots provided in the adjacent wall of the supply channel 26 and to be located just downstream of the inlet 24. Since in this position, the stuffer fork 36a at least essentially closes the crop inlet 24, crop to be baled can be compressed in the supply channel 26 which was brought into the supply channel 26 by the packer fork 30, shown only in FIG. 1.

Figure 4:
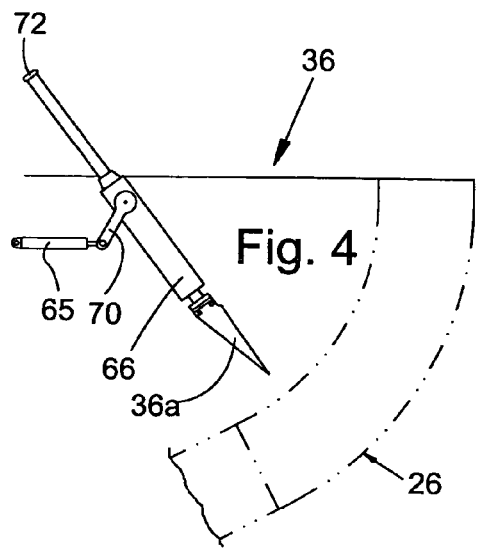
Figure 3:
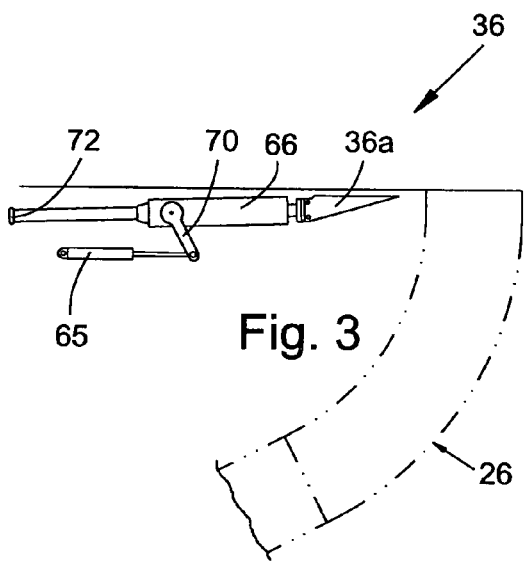
Figure 5:
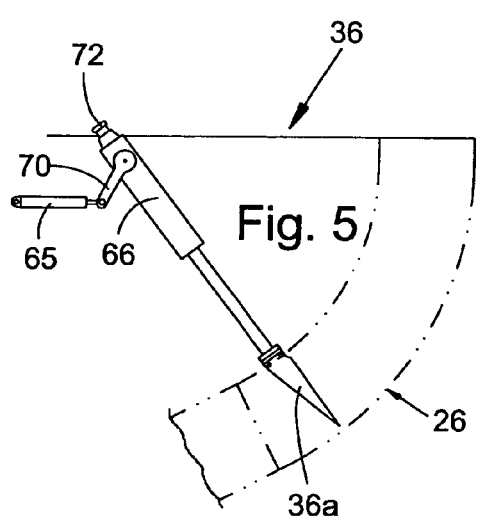

Referring now also to FIGS. 3–5, it can be seen that the stuffer fork assembly 36 is respectively shown in three different positions.

If the device 38 for determining the density of the crop to be baled has reached a certain pre-selected value, then the motor 66 is controlled by a control arrangement of the baler 10, not shown, in such a way that it occupies its retracted position (FIG. 3), wherein the stuffer fork 36a is withdrawn from the supply channel 26 and the crop inlet 24 is freed.

Thereupon, the first motor 66 is pivoted by the second motor 68 into the position shown in FIG. 4 and the stuffer fork 36a, according to the illustration of FIG. 5, is pivoted into a position spaced downstream of the crop inlet 24. Here the motor 66 is extended, whereby the stuffer fork 36a again projects through the adjacent slotted wall of the supply channel 26 so as to be located within the supply channel.

Now, the second motor 65 is again extended and pivots the first motor 66 such as to cause the stuffer fork 36a to sweep upwardly along a curved path following the interior of the supply channel until the stuffer fork 36a reaches its initial position, shown in FIG. 2, whereby the loader fork 36a conveys, or inserts, the crop to be baled that is contained in the supply channel 26 into the baling chamber 18. The crop inlet 24 is now closed again, and the next pre-compression process can begin.

Provision can be made for controlling the motors 66 and 65 so as to bring, and retain, the stuffer fork 36a into a position, within the supply channel 26, between the initial position (FIG. 2) and the position shown in FIG. 5, once a charge of pre-compressed crop has been swept into the baling chamber 18 upon reaching a predetermined initial baling density or after the expiration of a predetermined time interval, or after a predetermined number of cycles of the packer fork 30. This is an independent invention that can be applied independently of the characteristics described above. Here provision can also be made for the stuffer fork 36a to be brought and retained correspondingly into two or more positions in the supply channel 26. Thus, the stuffer fork 36a may be used to subdivide the supply channel 26 in such a way that the crop to be baled is compressed by the packer fork 30 at first against the stuffer fork 36a arranged in the first position and subsequently against the stuffer fork 36a arranged in a further position. In this way, a uniform density of the crop to be baled can be attained over the entire extent of the supply channel 26, whereby at the end, crop brought into the baling chamber 18 by the stuffer fork 36a exhibits an improved homogeneity and the baler 10 produces a bale with improved baling density.

Beyond that, if a retaining fork is used as is known in the prior art, the stuffer fork 36a can be used for further compressing the crop to be baled, when the fork 36a is again brought into the supply channel 26 anew and moved by the second motor 68 a distance along the supply channel 26 in the direction towards the inlet 24.

Having described the preferred embodiment, it will become apparent that various modifications can be made without departing from the scope of the invention as defined in the accompanying claims.

The invention claimed is:

1. A process of pre-compressing crop within, and delivering pre-compressed crop from, a supply channel to an inlet of a baling chamber of a large rectangular baler, comprising the steps of:
   a. positioning a stuffer fork at a first location in said supply channel just downstream from said inlet;
   b. operating a packer fork for introducing crop into the supply channel;

c. causing said stuffer fork to be removed from said first location in said supply channel and inserted into said supply channel at a second location remote from said first location when one of the following conditions have occurred:
 i. a pre-selected number of packer fork cycles has occurred, or
 ii. a pre-selected time has elapsed since last stuffing action, or
 iii. crop in said supply channel has been compressed to a pre-selected density; and d. subsequent to an occurrence of said one of said conditions set forth in part c, moving said stuffer fork through said supply channel back to said first position.

2. The process, as defined in, claim 1, wherein, instead of being positioned at said first position, said stuffer fork is initially positioned at a third position in said supply channel which is located between said first and second locations and is retained in this position until one of said conditions set forth in part c occurs.

* * * * *